(12) United States Patent
Klein

(10) Patent No.: US 8,185,960 B1
(45) Date of Patent: May 22, 2012

(54) SYSTEM AND METHOD FOR MANAGING ACCESS TO ADAPTER FEATURES

(75) Inventor: Roger J. Klein, Margarita, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 1024 days.

(21) Appl. No.: 11/493,978

(22) Filed: Jul. 27, 2006

(51) Int. Cl.
*G06F 21/00* (2006.01)

(52) U.S. Cl. .......................................... 726/27

(58) Field of Classification Search ............... 726/27
See application file for complete search history.

(56) References Cited

U.S. PATENT DOCUMENTS

| | | | |
|---|---|---|---|
| 5,892,900 A | 4/1999 | Ginter et al. | |
| 5,982,899 A * | 11/1999 | Probst ................................ | 713/1 |
| 6,044,350 A * | 3/2000 | Weiant et al. .................... | 705/76 |
| 6,233,567 B1 | 5/2001 | Cohen | |
| 6,247,026 B1 | 6/2001 | Waldo et al. | |
| 6,263,350 B1 | 7/2001 | Wollrath et al. | |
| 6,421,711 B1 | 7/2002 | Blumenau et al. | |
| 6,502,162 B2 | 12/2002 | Blumenau et al. | |
| 6,665,714 B1 | 12/2003 | Blumenau et al. | |
| 6,799,255 B1 | 9/2004 | Blumenau et al. | |
| 6,820,063 B1 | 11/2004 | England et al. | |
| 6,839,815 B2 | 1/2005 | Kagami et al. | |
| 6,892,264 B2 | 5/2005 | Lamb | |
| 6,898,618 B1 | 5/2005 | Slaughter et al. | |
| 6,948,168 B1 * | 9/2005 | Kuprionas .................... | 717/178 |
| 6,988,130 B2 | 1/2006 | Blumenau et al. | |
| 7,085,877 B1 * | 8/2006 | Larsen .......................... | 710/315 |
| 7,260,737 B1 * | 8/2007 | Lent et al. ......................... | 714/5 |
| 7,467,191 B1 | 12/2008 | Wang et al. | |
| 2004/0010643 A1 * | 1/2004 | Thomas, III ................... | 710/104 |
| 2004/0038710 A1 * | 2/2004 | Zechlin ......................... | 455/557 |
| 2004/0158582 A1 | 8/2004 | Takagi et al. | |
| 2005/0027657 A1 * | 2/2005 | Leontiev et al. ............... | 705/59 |
| 2005/0038752 A1 * | 2/2005 | Gaetano et al. ................ | 705/59 |
| 2005/0049976 A1 * | 3/2005 | Yang ............................... | 705/67 |
| 2005/0097359 A1 * | 5/2005 | Speare et al. ................ | 713/201 |
| 2006/0036847 A1 | 2/2006 | Bush et al. | |
| 2008/0244579 A1 | 10/2008 | Muller | |

OTHER PUBLICATIONS

Irwin, David "Sharing Networked Resources with Brokered Leases", Duke University,(Apr. 27, 2006).
"Office Action from USPTO dated Mar. 25, 2010 for U.S. Appl. No. 12/032,484".
"Final Office Action from USPTO dated Sep. 21, 2010 for U.S. Appl. No. 12/032,484".
"Final Office Action from USPTO dated Nov. 28, 2011 for U.S. Appl. No. 12/032,484".
"Office Action from USPTO dated Jun. 17, 2011 for U.S. Appl. No. 12/032,484".

* cited by examiner

*Primary Examiner* — Michael S McNally

(74) *Attorney, Agent, or Firm* — Klein, O'Neill & Singh, LLP

(57) ABSTRACT

Methods and systems for managing access to a host bus adapter ("HBA"). One embodiment includes licensable features stored in a feature module of the HBA. A user can access the licensable features after gaining permission.

25 Claims, 3 Drawing Sheets

SYSTEM AND METHOD FOR MANAGING ACCESS TO ADAPTER FEATURES

BACKGROUND

1. Field of the Invention

The present invention relates to computing systems, and more particularly, to managing access to host bus adapter features and functions.

2. Background of the invention

Computing systems typically include several functional components. These components may include a central processing unit (CPU), main memory, input/output ("I/O") devices, and streaming storage devices (for example, tape drives). In conventional systems, the main memory is coupled to the CPU via a system or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

Host systems are used in various network applications, including storage area networks ("SANs"). In SANs, plural memory storage devices are made available to various host computing systems. Data in a SAN is typically moved between plural host systems and storage systems (or storage devices, used interchangeably throughout this specification) through various controllers/adapters, for example, host bus adapters ("HBA", may also be referred to as a controller and/or adapter).

HBAs can have different capabilities and features. For example, a HBA can have 1, 2 or more ports. A HBA may be capable of transferring data at different rates, for example, 1 gigabit ("Gb"), 2 Gb, 4 Gb and other rates. A HBA can have different levels of security for encrypting data packets, for example, packets may have no encryption to varying levels of encryption. A HBA can have different levels of error correction code ("ECC") protection when data moves to/from host system memory.

Typically, HBA providers (that includes manufacturers/designers), for example, QLogic Corporation (the Assignee of the present application) sell HBAs at a base price where all the features are made available to a customer. Hence, when a customer buys a HBA, they have access to all the capabilities offered by the HBA.

HBAs features continue to be added/upgraded as bandwidth and SAN requirements continue to increase. The conventional model of providing all the features is not the best business model for both the HBA providers and customers. For example, if a HBA has 4 ports and a customer only needs to use 2 ports, then it does not make sense for the customer to pay for all 4 ports and only use 2 ports. From a HBA provider's perspective, to offer a single price/default feature based product limits access to different types of customers/business environments.

Therefore, there is a need for a system and method that allows customization of HBA features/prices.

SUMMARY OF THE INVENTION

In one aspect of the present invention, a method for managing access to a host bus adapter ("HBA") is provided. The method comprising maintaining licensable features in a feature module; receiving a request from a user for access to a licensable feature; granting permission to access the licensable feature; and enabling user access to the licensable feature after granting access.

In another aspect of the present invention, a host bus adapter ("HBA") is provided. The host bus adapter includes a processor for executing firmware code for controlling access to licensable features; and a feature module including a plurality of licensable features that a user can access after obtaining permission.

In yet another aspect of the present invention, a network system is provided. The network system includes a host computing system coupled to plural devices via a host bus adapter (HBA) having a processor; which enables access to HBA default features by executing firmware code; and a feature module in the HBA includes a plurality of licensable features that a user can access after obtaining permission.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate but not limit the invention. The drawings include the following figures.

DETAILED DESCRIPTION

To facilitate an understanding of the preferred embodiment, the general architecture and operation of a SAN, and a HBA will be described. The specific architecture and operation of the embodiments will then be described with reference to the general architecture of the SAN and HBA.

Figure 1:
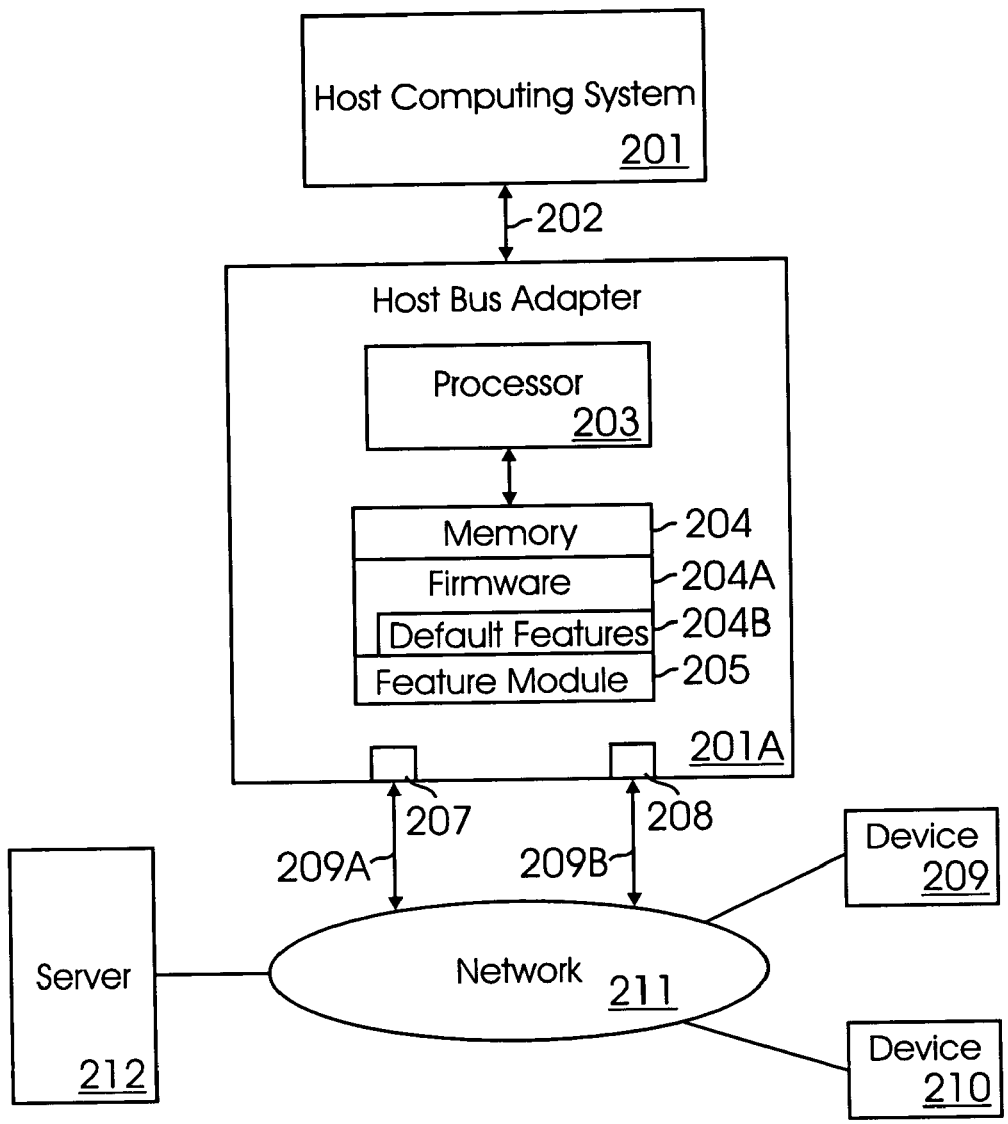
FIG. 1 shows a block diagram of a host system communicating with plural devices via a HBA, according to an aspect of the invention.

Host System/HBA:

FIG. 1 shows a host system 201 (may also be referred to as "host computing system") communicating with SAN 211 via HBA 201A (also referred to as adapter 201A, interchangeably). The host system may include a computer, server or other similar devices, which may be coupled to storage systems. In one aspect, host system 201 includes a host processor, random access memory ("RAM"), read only memory ("ROM"), storage devices (for example, a hard disk) and other components.

Host system 201 communicates via HBA 201A with networked devices 209 and 210. In the FIG. 1 example, HBA 201A includes ports 207 and 208, which enable HBA 201A to communicate with devices 209 and 210 via links 209A and 209B. Devices 209 and 210 include storage devices, other servers and the like.

Various standard protocols may be used to enable these communications, for example, Fibre Channel, Infiniband, and iSCSI. The standard protocols are incorporated herein by reference in their entirety, however the adaptive aspects of the present invention are not limited to any particular protocol. The adaptive aspects of the present invention, assume that communication between Host 201 (via HBA 201A) will be enabled.

HBA 201A is coupled to host system 201 via bus 202. Bus 202 can be a standard bus, for example, PCI, PCI-X or PCI-Express bus, however the adaptive aspects of the present invention are not limited to any particular bus standard. The bus standards are incorporated herein by reference in their entirety.

In one aspect, HBA 201A includes a processor 203, which may be a reduced instruction set computer ("RISC"). Processor 203 executes code (firmware 204A) instructions for various HBA operations. The firmware instructions are stored in non-volatile memory 204.

Various default features 204B are controlled and enabled by firmware 204A. Default features 204B are features that a user can access based on a base price of HBA 201A. HBA providers can code different default features, based on customer base and overall business environment. For example, when a customer buys a multi-port HBA, at least one port can be enabled and used by the user. The use of one port is a default feature. A HBA may operate at a basic speed for example, 1 Gb and that default rate is coded into firmware code 203B. The present invention is not limited to any particular type of default feature.

Memory 204 may also store a feature module 205 described below with respect to FIG. 2A, according to one aspect of the present invention. Feature module 205 stores licensable features (205A, FIG. 2A), which allows a user to upgrade and/or modify the default features.

Figure 2A:
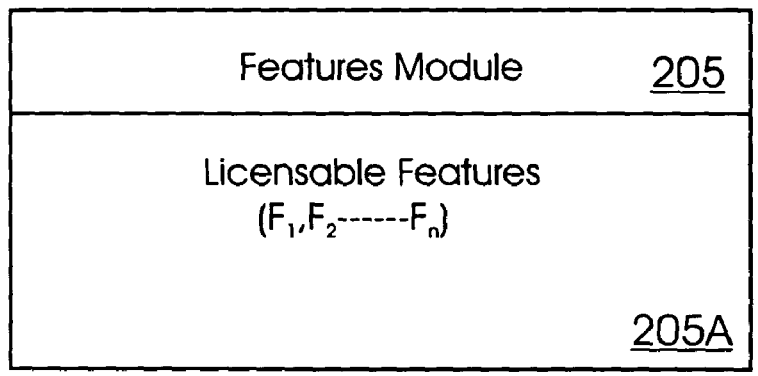
FIG. 2A shows a feature module, according to an aspect of the invention.

FIG. 2A shows an example of feature module 205, according to one aspect of the present invention. Feature Module 205 stores licensable features 205A, represented as F1-Fn.

Figure 2B:
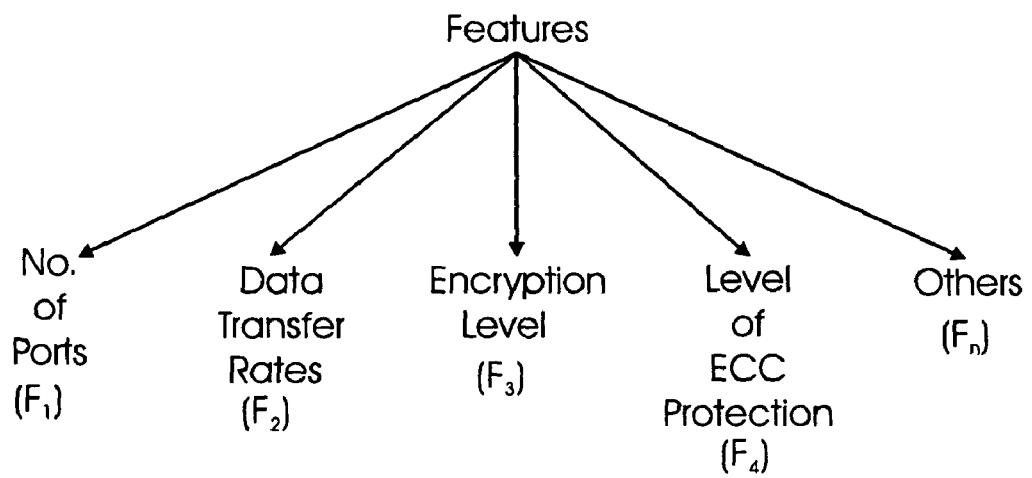
FIG. 2B shows examples of features provided by a HBA provider and used by a user.

FIG. 2B shows an example of what type of features may be offered and included in feature module 205. For example, licensable features 205A may include without limitation, number of active ports, data transfer rates, encryption levels, level/type of ECC and others. These examples are only meant to illustrate the adaptive aspects of the present invention and are not intended to limit the invention to any particular feature.

Although feature module 205 is shown as being stored in memory 204, the present invention is not limited to a specific storage location. Feature module 205 may be provided elsewhere in HBA 201A as long as it is accessible by processor 203. In one aspect of the present invention, feature module 205 may be a table or listings stored in memory 204, such as non-volatile storage; or feature module 205 may be implemented by other means, for example, as hardware register bits, accessible to processor 203.

In one aspect of the present invention, a user can access licensable features 205A by sending a request to a server 212 (FIG. 1A). In one aspect of the present invention, a HBA provider may maintain server 212, or optionally, any other entity may maintain server 212. The request for licensable features 205A is approved/authorized (or granted) by server 212. Server 212 may be any computing system/device that is authorized to permit access to additional (licensable) features can be used, according to the adaptive aspects of the present invention.

The following illustrates how features can be updated, according to one aspect of the present invention. When a user buys a HBA, the user may have access to a single port (for example, Port 1 (207), FIG. 1A), i.e., only one port is operational at a lower transfer rate (for example 1 Gb). In this example, access to Port 1 is a default feature. If the user wants to access Port 2 (such as Port 208) at a faster speed (for example, 2 Gb or 4 Gb), then the user sends a request to server 212 for permission. User may have to pay an additional amount for getting permission to operate Port 2 at a higher rate (licensable feature 205A). Once permission is granted and the fee paid, the user can have access to the second port (208) at a faster speed.

Figure 3:
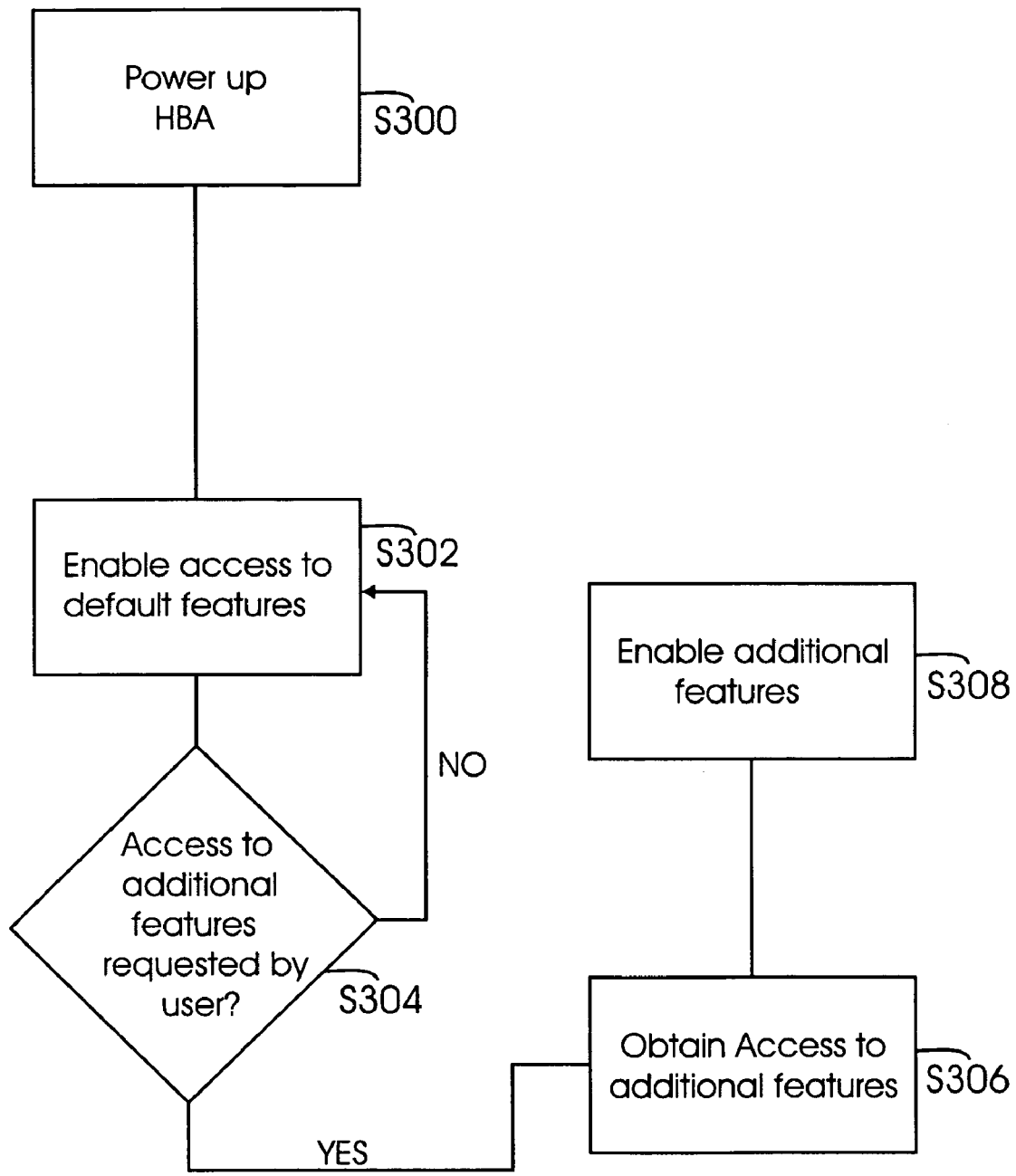
FIG. 3 shows a flow diagram for managing access to HBAs, according to an aspect of the present invention.

FIG. 3 shows a process flowchart for managing access to HBAs so that users can select features and HBA providers can generate revenue by providing licensable features. The process starts in step S300 when HBA 201A is powered up. In step S302, firmware code 204A enables access to default features 204B.

In step S304, HBA 201A determines if a user has requested access to additional features (i.e. licensable features 205A). As discussed above, licensable (or additional) features may include, for example, use of additional ports; higher transfer rates than default transfer rates and/or additional security levels when data is sent/leaves HBA 201A. If access to additional features has not been requested, then HBA 201A continues to operate.

In step S304, if additional features are requested, the user request is sent to server 212 (FIG. 2A). In step S306, access to the requested features is obtained. A license key (not shown) is downloaded that updates licensable features 205A in feature module 205. The license key allows a user to use a particular licensable feature. The term license key is a piece code that provides access to a particular feature. The code (i.e. the license key) can be encrypted. The present invention is not limited to any particular types of license key/format.

In step S308, access to additional features is enabled. Firmware 204A uses the license key to enable access to the requested licensable feature.

In one aspect, the present invention provides both users and HBA providers' flexibility. A user can pay a base price with certain default features. Based on user need/choice, the features can be updated. HBA providers can generate additional revenue from the update process.

Although the present invention has been described with reference to specific embodiments, these embodiments are illustrative only and not limiting. Many other applications and embodiments of the present invention will be apparent in light of this disclosure and the following claims.

What is claimed is:

1. A method for managing access to a host bus adapter ("HBA"), comprising:
    maintaining a plurality of default features in the HBA, the default features being accessible based on a base price of the HBA;
    maintaining a plurality of licensable features in a feature module stored in the HBA, the licensable features enabling upgrade of the default features, the licensable features including at least additional security levels for encrypting data packets via an encrypted license key, access to additional ports, and higher transfer rates than default transfer rates;
    receiving a request for access to one of the licensable features;
    granting permission to access the requested licensable feature; and
    enabling access to the requested licensable feature after granting access.

2. The method of claim 1, wherein a computing system grants access via a license key for the requested licensable feature.

3. The method of claim 2, wherein a HBA provider or any other entity maintains the computing system that grants the license key.

4. The method of claim 1, wherein the feature module comprises a listing of the licensable features and is stored in non-volatile memory accessible to a processor.

5. The method of claim 1, further comprising receiving a fee in connection with the request for access to one of the licensable features, and only granting permission to access the requested licensable feature after the fee is received.

6. A host bus adapter ("HBA"), comprising:
a memory for storing executable instructions;
a processor for executing firmware code for controlling access to a plurality of licensable features;
a plurality of default features stored in the HBA, the default features being accessible based on a base price of the HBA; and
a feature module stored in the HBA, the feature module including the plurality of licensable features that can be accessed to upgrade the default features after obtaining permission, the licensable features including at least additional security levels for encrypting data packets via an encrypted license key, access to additional ports, and higher transfer rates than default transfer rates.

7. The HBA of claim 6, wherein permission is received from a computing system via a license key.

8. The HBA of claim 7, wherein the computing system can operate as a server maintained by a HBA provider or any other entity.

9. The HBA of claim 6, wherein the feature module is stored in non-volatile memory.

10. The HBA of claim 6, wherein the licensable features can only be accessed after paying a fee.

11. A network system, comprising:
a host computing system;
a host bus adapter (HBA) having a processor, the HBA coupling the host computing system to a plurality of devices;
a plurality of default features stored in the HBA, the default features being accessible based on a base price of the HBA, wherein the processor enables access to the HBA default features by executing firmware code; and
a feature module stored in the HBA, the feature module including a plurality of licensable features that can be accessed to upgrade the default features after obtaining permission, the licensable features including at least additional security levels for encrypting data packets via an encrypted license key, access to additional ports, and higher transfer rates than default transfer rates.

12. The network system of claim 11, wherein a computing system grants permission for the licensable features via a license key.

13. The network system of claim 12, wherein the computing system can operate as a server maintained by a HBA provider or any other entity.

14. The network system of claim 11, wherein the feature module is stored in non-volatile memory.

15. The network system of claim 11, wherein the licensable features can only be accessed after paying a fee.

16. An adapter comprising:
a memory for storing executable instructions;
a processor for executing firmware code for controlling access to licensable features;
a plurality of default features stored in the adapter, the default features being accessible based on a base price of the adapter; and
a feature module stored in the adapter, the feature module including a plurality of licensable features that can be accessed to upgrade the default features after obtaining permission, the licensable features including at least additional security levels for encrypting data packets via an encrypted license key, access to additional ports, and higher transfer rates than default transfer rates.

17. The adapter of claim 16, wherein permission is received from a computing system via a license key.

18. The adapter of claim 17, wherein the computing system can operate as a server maintained by an adapter provider or any other entity.

19. The adapter of claim 16, wherein the feature module is stored in non-volatile memory.

20. The adapter of claim 16, wherein the licensable features can only be accessed after paying a fee.

21. A network device comprising:
a memory for storing executable instructions;
a processor for executing firmware code for controlling access to licensable features;
a plurality of default features stored in the network device, the default features being accessible based on a base price of the network device; and
a feature module stored in the network device, the feature module including a plurality of licensable features that can be accessed to upgrade the default features after obtaining permission, the licensable features including access to additional ports, higher transfer rates than default transfer rates, and additional security levels for encrypting data packets via an encrypted license key.

22. The network device of claim 21, wherein permission is received from a computing system via a license key.

23. The network device of claim 22, wherein the computing system can operate as a server maintained by an adapter provider or any other entity.

24. The network device of claim 21, wherein the feature module is stored in non-volatile memory.

25. The network device of claim 21, wherein the licensable features can only be accessed after paying a fee.

* * * * *